Nov. 15, 1927.
I. J. VAN HUFFEL
1,648,921
ELECTRIC PIPE WELDING METHOD AND APPARATUS
Filed April 14, 1926  4 Sheets-Sheet 1
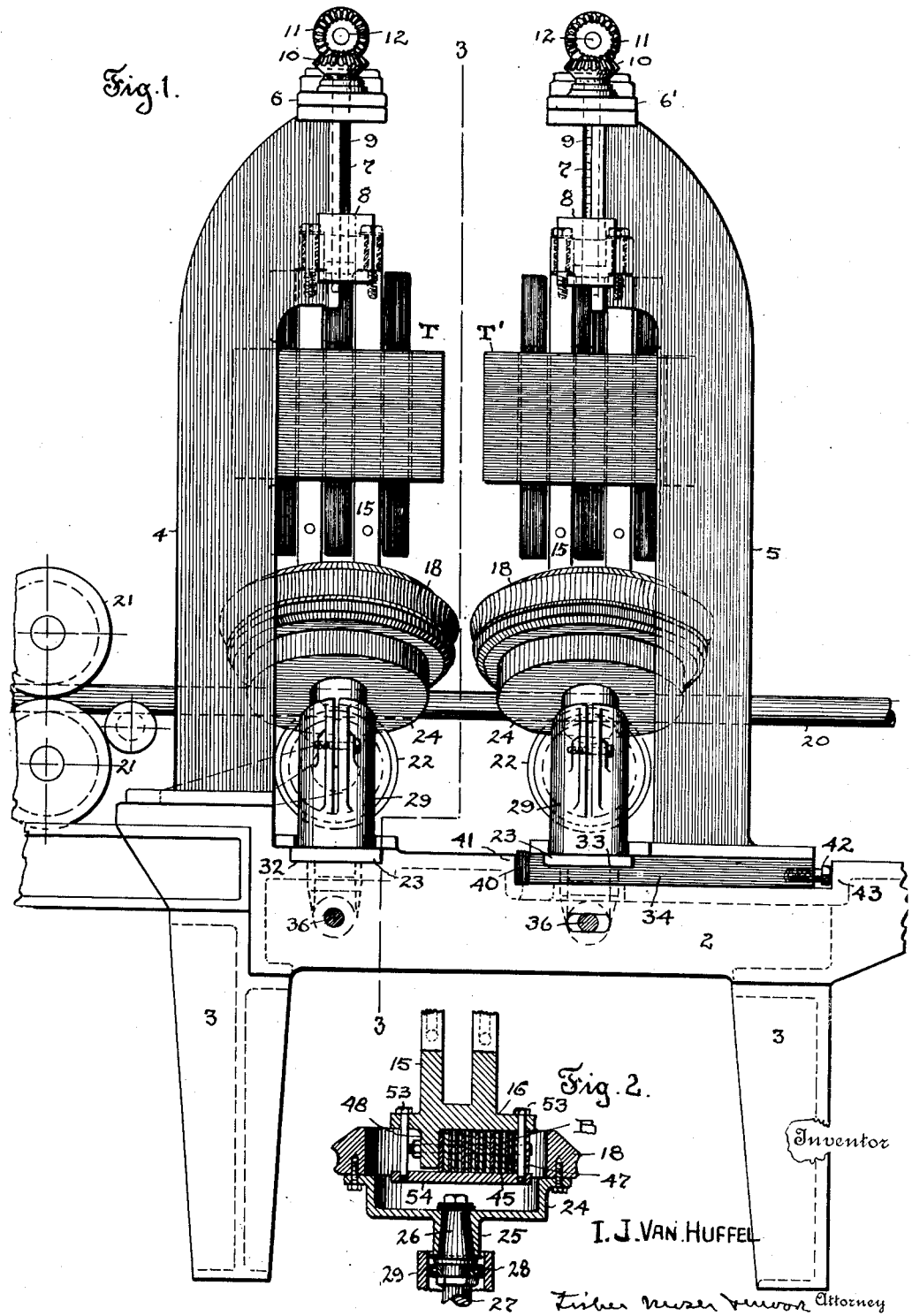

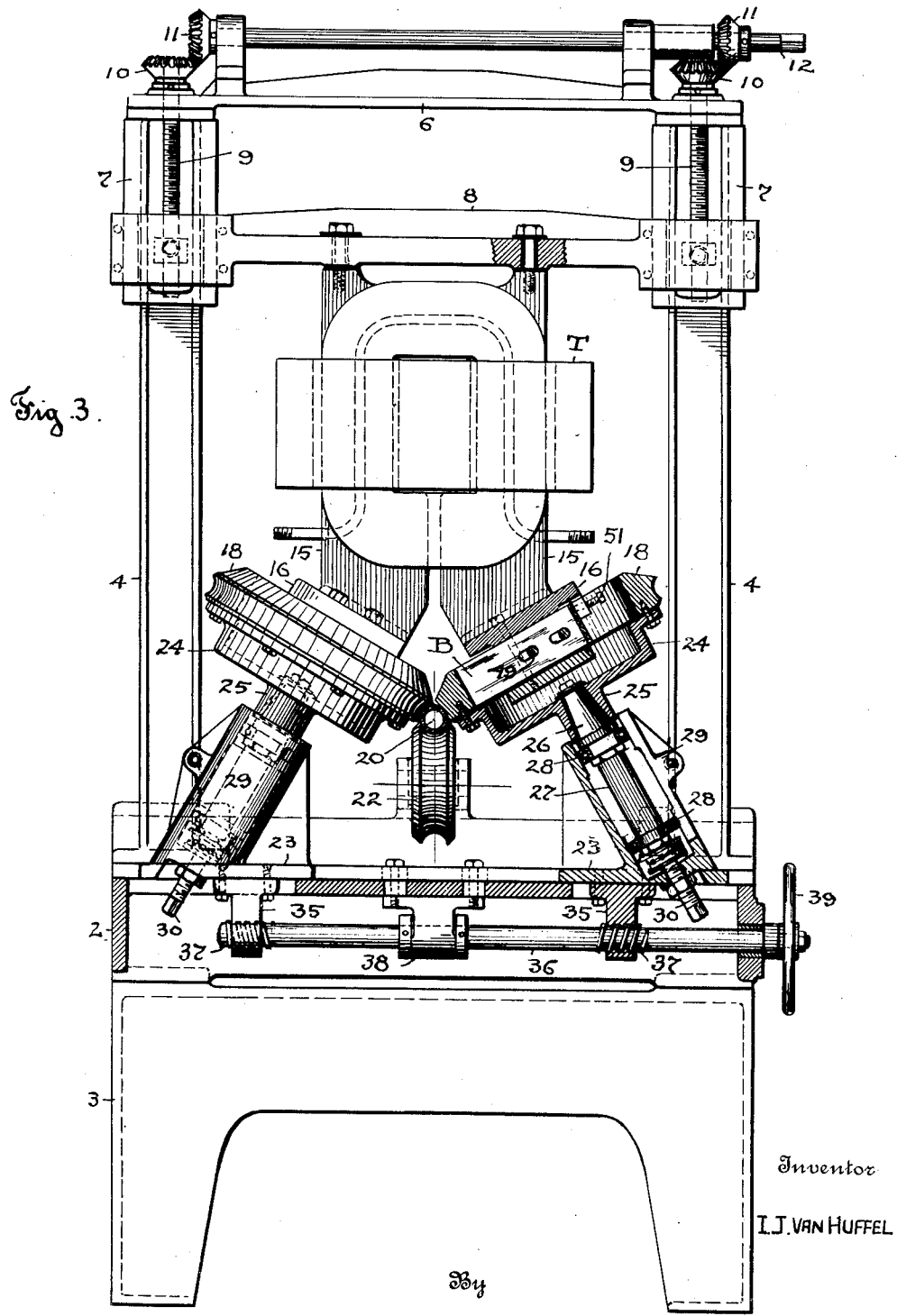

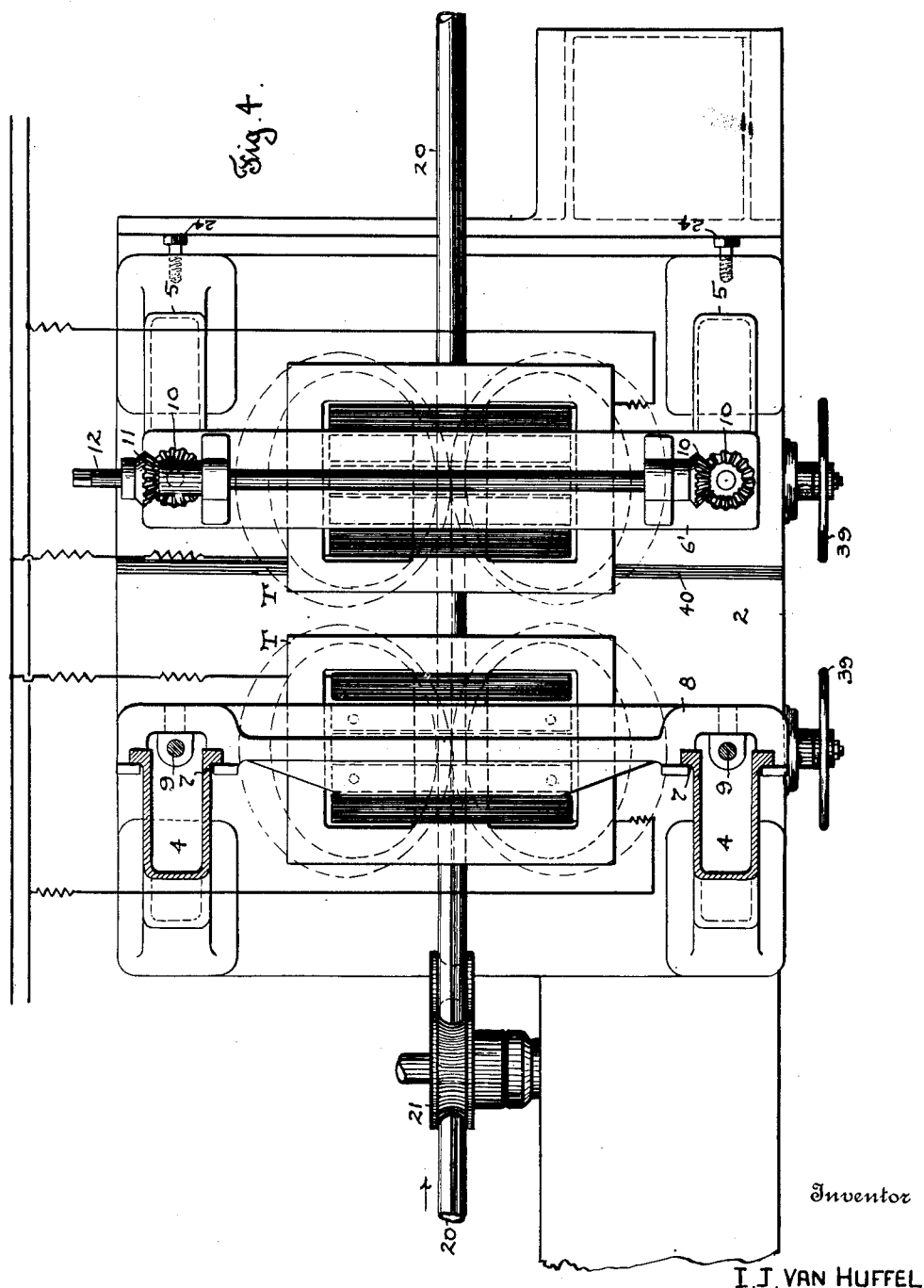

Nov. 15, 1927. 1,648,921
I. J. VAN HUFFEL
ELECTRIC PIPE WELDING METHOD AND APPARATUS
Filed April 14, 1926    4 Sheets-Sheet 4
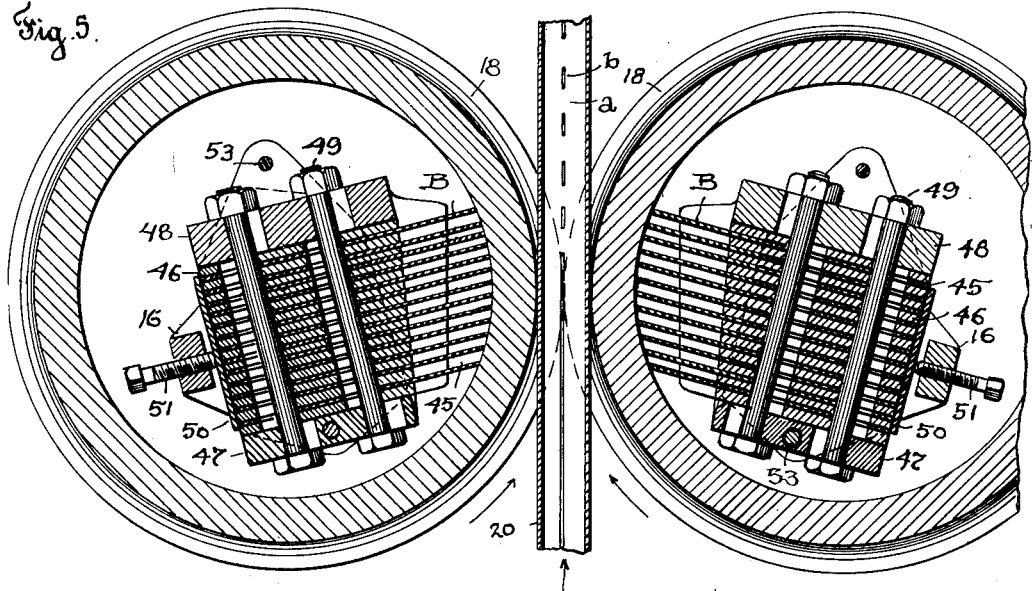
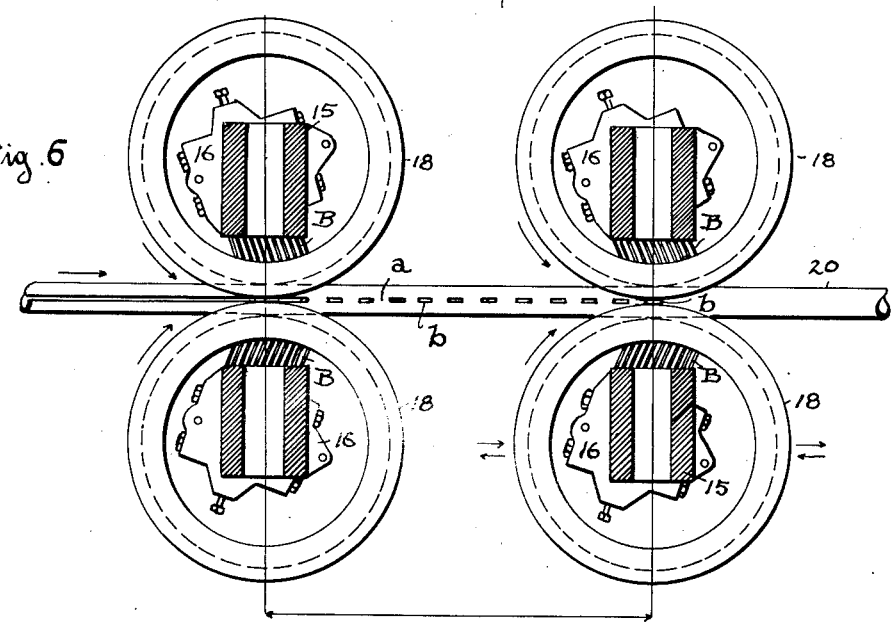
Inventor
I. J. VAN HUFFEL
By
Attorney Patented Nov. 15, 1927.

1,648,921

UNITED STATES PATENT OFFICE.

ISADORE J. VAN HUFFEL, OF WARREN, OHIO.

ELECTRIC PIPE-WELDING METHOD AND APPARATUS.

Application filed April 14, 1926. Serial No. 101,885.

My invention relates to an improvement in electrical welding apparatus, and more particularly in a machine for welding a longitudinal seam in a metal tube or two metal pieces. In general, my object is to provide a machine which will weld a seam in an efficient and rapid manner; which will permit the work to be fed rapidly through the machine; and which will produce interlapping welds and a closed seam in the completed product. Other objects are embodied in the annular electrodes and the adjustable brushes associated with said electrodes whereby the welding current may be passed through a segmentary portion of each annulus and concentered in the tube in the localized area under pressure. The brushes for the annular electrodes are also mounted directly upon the transformer secondary to promote efficiency in operations, and the secondary is particularly constructed to suspend a pair of brushes at diverging angles within a pair of ring-shaped electrodes which are also supported in angular relation to facilitate adjustments and clamping of the work as well as to permit convenient assembly of the parts and to make them accessible for inspection, repairs and replacements. The machine also comprises two transformers and two sets of welding electrodes to permit two welds to be produced simultaneously at definitely spaced distances in the seam, and the two sets of welding devices are adjustably related to permit the welds to be interlapped and thereby produce a completely closed seam and a continuous weld in the finished product.

In the accompanying drawings, Fig. 1 is a side elevation of my improved welding machine, and Fig. 2 is a sectional view of one of the annular welding electrodes and a brush suspended therein from the secondary of a transformer, only the lower bifurcated end of one leg of the secondary being shown, Fig. 3 is a vertical section of the machine on line 3—3 of Fig. 1, showing one of the annular welding electrodes in section and the companion electrode in elevation. Fig. 4 is a top view of the machine, showing the standards at one end of the machine in section. Fig. 5 is an enlarged sectional view looking upwardly through a pair of welding electrodes and their respective electric current conducting brushes therein. Fig. 6 is a top view of a piece of tubing passing between two pairs of welding devices such as delineated in Fig. 5, and Fig. 7 is a longitudinal section of the tube on the line of the seam.

The machine comprises a suitable bed or frame 2 mounted upon legs 3, and separate pairs of standards or uprights 4—4 and 5—5, respectively, supported upon opposite ends of the bed or frame.

Connecting plates 6—6' secure the top of each pair of standards rigidly together, and a vertical portion of each standard is flanged to provide guide ways 7 for a sliding cross beam 8 which is suspended from and adapted to be raised and lowered by a pair of vertical screws 9—9 having bevel gears 10—10 which mesh with similar gears 11—11 on a cross shaft 12 at the top of each plate 6. Suspended centrally from each cross beam is an electric welding transformer, the pair being marked T and T', respectively, see Fig. 1. Each transformer has a divided secondary 15 with angular terminals 16—16 of opposite polarity, each of which support suitable means for clamping a series of electric-current conducting brushes B—B adjustably therein so that good contact may be established and maintained between the ends of each brush and a set of opposed welding electrodes 18—18 of ring shape. These brushes and electrodes are suspended in obtusely inclined relation so that the brushes may extend into the upper open side of the ring-shaped electrodes and engage the internal circular walls thereof, and so that both pairs of brushes may be raised bodily out of both rings or electrodes whenever cross beam 8 is elevated by rotating cross shaft 12. The peripheral surface of each ring or electrode is beveled in part to permit a pair of such rings to be inclined obtusely in respect to each other without coming into contact, and the lower peripheral part of each ring is grooved to permit rolling contact and a clamping pressure to be applied to a split tube 20 when passed between them. Feeding of the tube may be accomplished in any suitable way, for example, by feed rollers 21—21 located at one end of the machine, see Fig. 1, and the tube may be supported by idler rollers 22—22 immediately beneath the point of rolling contact of each pair of ring electrodes. The brushes are movable in a vertical plane, as previously described, and each pair of ring electrodes may be shifted transversely of the bed or frame either toward or away from each other so that the clamping pressure on the tube may be regulated. Thus each electrode is carried upon a slidable support 23 at the top of bed 2, as hereinafter described in more detail, and the paired electrodes of ring shape rotate independently as welding proceeds, the feed of the tube and the contacting pressure of the electrodes inducing such movement. For that purpose each ring electrode is detachably secured to the flange of a dished disk or wheel 24 having a hub 25 with a tapered opening which is bushed with insulating material and adapted to be removably clamped in a wedged position upon the tapered extremity 26 of an inclined shaft 27, and which shaft has rotatable bearing in ball bearing collars 28 held fixedly but removably within a split clamping holder 29 forming the main movable support for the electrode. An adjustable set screw 30 and thrust bearing is also provided at the lower end of shaft 27 to fix the shaft and electrode at any desired elevation and to place the opposing electrodes in proper working alignment. Each holder 29 has a base part 23 which operates as a slide when seated within transverse guide ways 32 and 33 in the top of bed 2 and in a movable table 34, respectively. Brackets 35 project downwardly from the base part 23 of each holder 29, and a shaft 36 having reversely-screw-threaded portions 37 sleeved through these brackets serves to adjust each pair of holders back and forth in respect to each other, the shaft having a bearing 38 affixed to bed 2 and being provided with a hand wheel 39 to rotate it when the paired electrodes are to be separated or brought nearer together. Table 34 supports standard 5 which carries transformer T' and one pair of ring electrodes, and this table and the parts thereon may be shifted bodily lengthwise of the tube to be welded, thereby placing the two sets of spaced electrodes nearer together, or farther apart as working conditions may require in making two welds at spaced intervals in the seam at the same time. A variable setting of the two sets of electrodes may be effected and fixed by shims 40 introduced between one edge of plate 34 and a shoulder 41 on bed 2, and by a set screw 42 in the opposite edge of the plate where the head of the screw may bear against a second shoulder 43 in bed 2, see Fig. 1. The advantage of using and mounting two sets of electrodes for adjustment and change in position in the way described will be explained hereinafter in detail, but briefly, this arrangement permits a tube to be fed rapidly between separated pairs of electrodes to produce a series of welds interruptedly in the seam and in this case the interrupted welds are produced in interlapping union so that the product is continuously welded together without a gap or interstice linearly thereof. That is to say there are no unwelded places in the seam and product.

Now referring to Figs. 2, 3, and 5, the brush B for each electrode comprises a series of flat flexible blades 45 of varying length which are spaced apart by plates 46 and all clamped together between a clamping bar 47 and an integral flange 48 extending downwardly from one angular terminal 16 of secondary 15. Clamping is effected by horizontal bolts 49 which extend through slots in said parts to permit longitudinal adjustment of the contact blades in respect to the inner circular surface of the ring or electrode 18, and a backing plate 50 which engages the aligned ends of all of the blades 45 imparts a common adjustable movement to the blades upon adjusting a single set screw 51 on terminal 16. This terminal is in the form of a flat head which is perforated to receive vertical bolts 53 wherewith a bottom clamping plate 54 may be drawn upwardly against the bottom edges of contact blades 45 and thereby supplement the clamping action of horizontal bolts 49, see Fig. 2. Each secondary in this way embodies a brush holder at the end of each leg thereof, and the brushes or blades are adjustable to take up wear and to establish new contact settings with the ring electrodes when they are adjusted or moved back and forth in respect to each other. Blades 45 also extend beyond their spacing members 46 so that the exposed portions of the blades may spring or flex and maintain good contact during revolution of the ring electrode, and the blades in one brush holder extend obliquely to the blades of the other holder which is suspended from the same secondary. Contact is thus established in localized segmental areas in the two co-operating ring electrodes and the welding current is conducted from one brush to the other only where the two rings are opposed, thus permitting the larger circular part of each ring to cool during its rotative movement while concentering the entire heating current in a small section of each ring where engaged with the tube so that diffusion of the current is avoided and welding is expedited with maximum efficiency.

It is well known to those skilled in this art that the rate of feed of the stock governs whether either a continuous weld or a series of spaced welds will be produced by means of roller electrodes through which an alternating current is passed, say a current whose period is only about one-sixtieth of a second. If the rate of feed is slow the periodic flow takes place more often in each linear foot of the stock than if the rate of feed is faster, thereby permitting a continuous weld to be produced. But if the rate of feed is too fast to permit the stock to be heated uniformly linearly of the seam a series of interrupted welds are produced and a succession of welded and unwelded areas result. Thus in operating my apparatus, using sixty cycle alternating current and feeding the tube continuously between the electrodes at a predetermined rate of speed, a series of interrupted welds —a— may be produced at uniformly spaced intervals in the longitudinal seam of the tube as the tube passes between the first pair of ring electrodes suspended from the secondary of the first transformer T. The second transformer T' is connected in the same electric circuit as the first transformer and produces the same current flow and welding effect in the seam of the tube where at the moment the second pair of welding electrodes engage and apply pressure to the tube, see Fig. 6. The two sets of welding electrodes thereby produce two interrupted welds simultaneously at widely spaced places linearly in the seam. In addition to producing two such welds simultaneously on the same line or seam of the tube I produce the second series of interrupted welds in the gaps or spaces b of the partially completed seam, preferably in interlapping union with the first series of welds. The seam of the completed tube or finished product is thereby welded homogeneously together and the tube embodies a continuous fluid-tight joint capable of resisting high internal pressures.

As shown herein the ring electrodes are rotated by frictional contact with the tube as the tube is fed forward, but in welding gauge tubing I may use power to rotate the shafts which carry the ring electrodes. Obviously other changes or modifications may be made in the apparatus without departing from the spirit and scope of my invention.

What I claim is:

1. An electrical welding apparatus, comprising two sets of electrodes in tandem connected to a source of alternating current and constantly in contact with the work, means to produce relative motion between said sets of electrodes and work whereby both electrodes successively pass over the work, said sets of electrodes being positioned with respect to each other and the work that the one set welds the portions of the work left unwelded by the other set.

2. An electrical welding apparatus, comprising two sets of welding electrodes connected to a source of alternating current and contacting with the work in tandem, means to produce relative motion between said sets of electrodes and work whereby both electrodes successively pass over the work, and means for positioning the sets of electrodes with respect to each other and the work that the one set welds the portions of the work unwelded by the other set.

3. An electrical welding apparatus, comprising a source of alternating welding current, two sets of welding electrodes connected to said source of alternating current and constantly in contact with the work at spaced intervals on the same line, means for feeding the work to said sets of electrodes, and means for positioning the sets of electrodes with respect to each other and the work so that as one set of electrodes produces spaced welds the other set of electrodes coincidently welds the portions of the work left unwelded by the first set.

4. An electrical welding apparatus, comprising a table, an A. C. transformer and a set of rotatable seam welding devices mounted jointly upon said table, a second A. C. transformer and set of rotatable seam welding devices supported adjustably upon said table opposite said first set of welding devices, and means to feed a split tube to said separate sets of welding devices successively, said separate sets of welding devices being positioned with respect to each other and the work that the second set welds the portions of the seam left unwelded by the first set of welding devices.

5. A method of electric welding, consisting in passing an alternating current and applying pressure to a piece of work while feeding the work at a rate of speed that a series of welds will be produced at spaced intervals, and co-incidently also passing alternating current and applying pressure to the work at the places left unwelded so that a second series of welds will be produced intermediate the first series of welds.

6. A method of electric welding, consisting in applying pressure and passing an alternating current constantly in a localized area to a seam in a tube while feeding the tube at a rate of speed that a series of welds will be produced at spaced intervals longitudinally of the seam, and co-incidently with the foregoing steps applying pressure and passing an alternating current constantly in a second localized area to the seam intermediate the welded portions therein to produce a second series of welds, the rate of speed of the tube being also such that an interlapping union of the two series of welds is effected and a continuous welded seam is produced.

In testimony whereof I affix my signature.

ISADORE J. VAN HUFFEL.